(12) United States Patent  
Linden

(10) Patent No.: US 6,431,705 B1
(45) Date of Patent: *Aug. 13, 2002

(54) EYEWEAR HEART RATE MONITOR

(75) Inventor: Harry A. Linden, Santa Barbara, CA (US)

(73) Assignee: Infoeye, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/592,178

(22) Filed: Jun. 12, 2000

Related U.S. Application Data

(63) Continuation-in-part of application No. 09/437,539, filed on Nov. 10, 1999, now Pat. No. 6,345,343.

(51) Int. Cl.$^7$ ................................................. G02C 1/00
(52) U.S. Cl. ........................................ 351/158; 351/41
(58) Field of Search ........................... 351/158, 43, 41; 368/10, 276, 277, 278, 279; 345/7, 8

(56) References Cited

U.S. PATENT DOCUMENTS 5,585,871 A * 12/1996 Linden ....................... 351/158

* cited by examiner

Primary Examiner—Hung Xuan Dang
(74) Attorney, Agent, or Firm—Michael G. Petit

(57) ABSTRACT

A heart rate monitor adapted to be worn on eyewear such as a pair of eyeglasses, a mask or goggles. The heart rate monitor includes a sensor in contact with the bridge of the user's nose. The sensor is responsive to pressure variations or pulses produced during a heart beat cycle. The sensor provides an analog signal having a frequency equal to the user's pulse rate. The analog signal output from the sensor provides an input signal for a microprocessor which includes a frequency counter and signal averager. A microprocessor output signal having a magnitude which is proportional to the heart rate in beats per minute provides the input signal for an optical readout device such as a digital display which is preferably mounted on the frame or stem of the user's eyewear. The image on the optical display is conducted to an eyepiece lens which is mounted most preferably on one of the lenses of the eyewear by means of an image conduit such as a fiber optic or fiber optic bundle. The eyepiece lens is positioned such that the image of the optical display is positioned at the focal plane of the user's eye for comfortable viewing. In a most preferred embodiment of the heart rate monitor, the microprocessor, power supply and digital display are contained within a housing that is releasably attached to eyewear. The proximal end of a fiber optic bundle is adjustably attached to the housing and in optical communication with the digital display. A display lens is adjustably attached to the opposing distal end of the fiber optic bundle. A pair of pulse rate sensor electrodes in contact with a user's nose provide an electrical signal containing pulse rate data to the microprocessor. The image on the digital display is conducted by the fiber optic bundle to the display lens adjustably disposed within the field of view of the user.

1 Claim, 5 Drawing Sheets

EYEWEAR HEART RATE MONITOR

CROSS REFERENCE TO RELATED APPLICATIONS

This is a continuation-in-part of application Ser. No. 09/437,539; filed Nov. 10, 1999 now U.S. Pat. No. 6,345,343.

BACKGROUND OF THE INVENTION

1. Field of the Invention

The present invention relates generally to information displays and more particularly discloses a heart rate monitor and, even more particularly, to a heart rate monitor adapted to be mounted on a person's eyewear.

2. Prior Art

Eyewear-mounted information display devices are well known in the art. For example, Linden, in U.S. Pat. No. 5,585,871, the contents of which patent are incorporated herein by reference thereto, discloses an improved visual display device which monitors and provides visual access to a variety of information when the device is attached to, or incorporated within, a head-mountable accessory such as a pair of swim goggles, eyeglasses, protective goggles, shields, visors or the like. The device is particularly adapted for visually presenting performance information to an athlete without interfering with the athlete's ability to perform.

Linden, in U.S. Pat. Nos. 4,796,987, and 5,266,977 discloses a timing device including a digital display adapted to be mounted on protective headgear such as goggles by means of a suction cup. In use, the digital display is affixed to the wearer's eyewear within the wearer's field of view. The digital display device includes an integral lens which presents the image of the digital display to the wearer so as to be focused ten or more inches in front of the eye for comfortable viewing.

Examples of other devices which generally address eyewear-mounted digital displays are set forth in U.S. Pat. Nos. 4,796,987; 5,886,822; 4,776,045; 5,258,785; 5,697,792; and 4,806,011. Taba, in U.S. Pat. No. 5,685,722 discloses a swimmer's goggles incorporating an electronic timer and a digital display. The device includes an accelerometer and a clock, which, in combination with a signal processor, provides the swimmer with performance information such as the number of laps the swimmer has completed and the average time per lap.

Various wearable devices are known which provide the wearer with heart rate data. Such devices are sensitive to differences in the electrical potential of the skin at different distances from the heart. Most commonly, a first electrode is affixed to the skin overlying the heart and a second electrode is worn on the wrist or affixed to the skin at a distant location. Since the difference in potential between the electrodes is synchronous with the beating of the heart, such devices record the number of electrical impulses produced in response to a sequence of heart beats over a time interval and present the average heart rate during the sampling time interval to the wearer by means of a digital display normally worn on the wrist. A similar prior art device is mounted on the wrist and requires the user to place two fingers from the opposite hand onto contacts, the contacts being sensitive to infrared or Doppler signals. With such devices it is necessary for the wearer to bring his/her wrist into view, touch the device with the opposite hand and focus attention on the display. Such movements may undesirably disrupt the wearer's activity and have a detrimental effect his/her performance.

SUMMARY OF THE INVENTION

It is a first object of the invention to provide an eyewear-mountable heart rate monitoring device.

It is a further object of the invention to provide a heart rate monitoring device which is supported by and integral with eyewear.

It is another object of the invention to provide a heart rate monitoring device meeting the objectives set forth above wherein the device includes a digital display which is viewable by the wearer.

It is still another object of the invention to provide eyewear which includes means for sensing a wearer's heart rate integral therewith.

It is yet another object of the invention to provide eyewear which includes means for sensing a wearer's heart rate and means for displaying the wearer's heart rate integral therewith.

A device such as the present invention meets the foregoing objectives of the invention and enables the user to monitor his/her heart rate while performing an activity without interfering with the performance. The features of the invention believed to be novel are set forth with particularity in the appended claims. However the invention itself, both as to organization and method of operation, together with further objects and advantages thereof may be best be understood by reference to the following description taken in conjunction with the accompanying drawings in which:

DESCRIPTION OF THE PREFERRED EMBODIMENTS

Figure 1:
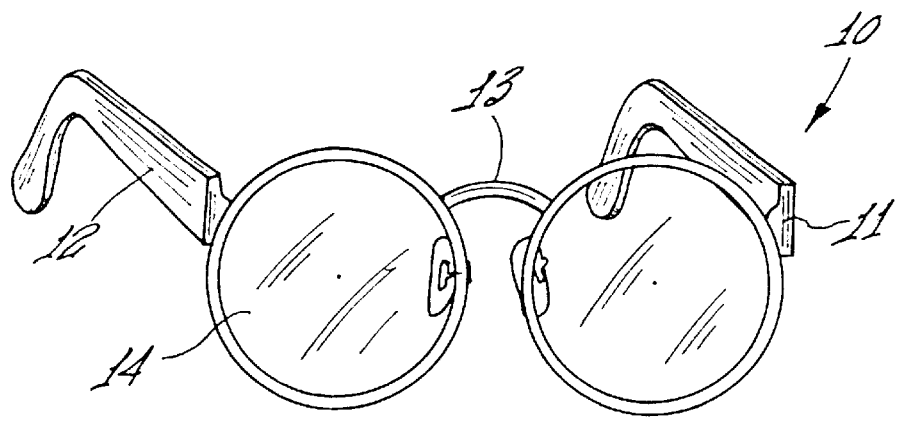
FIG. 1 is a perspective view of an example of prior art eyewear illustrating preferred portions of the eyewear suitable for supporting a heart rate monitor in accordance with the present invention.

The heart rate monitor of the present invention is releasably attached to a user by means of a head mountable frame which provides both physical support for the heart rate monitor and intimate contact with portions of the users head, including the skin overlying the bridge of the nose and/or the temple such as, for example, provided by prior art eyewear. Turning now to FIG. 1, an example of prior art eyewear is presented illustrating certain portions of the eyewear which are particularly suitable for supporting the portions of a heart rate monitor in accordance with the present invention. The eyewear 10 is intended to be generic and may be a pair of eye glasses, swim goggles, protective goggles or any form of eyewear wherein the eyewear is at least partially supported by, or comes in contact with, the bridge of a wearer's nose. While the bridge of the nose is the most preferable point of contact for the heart rate sensor comprising the present invention, other contact points such as the skin overlying the superficial temporal vessels of the face may be used for sensing the heart rate. The eyewear 10 comprises a frame portion 11, which serves to support a pair of lenses 14. The eyewear is attached to a wearer (not shown in FIG. 1) by means of a temple portion 12 and a bridge portion 13, which, in use, rests against the skin covering the bridge of a wearer's nose and is in intimate contact therewith.

Figure 2:
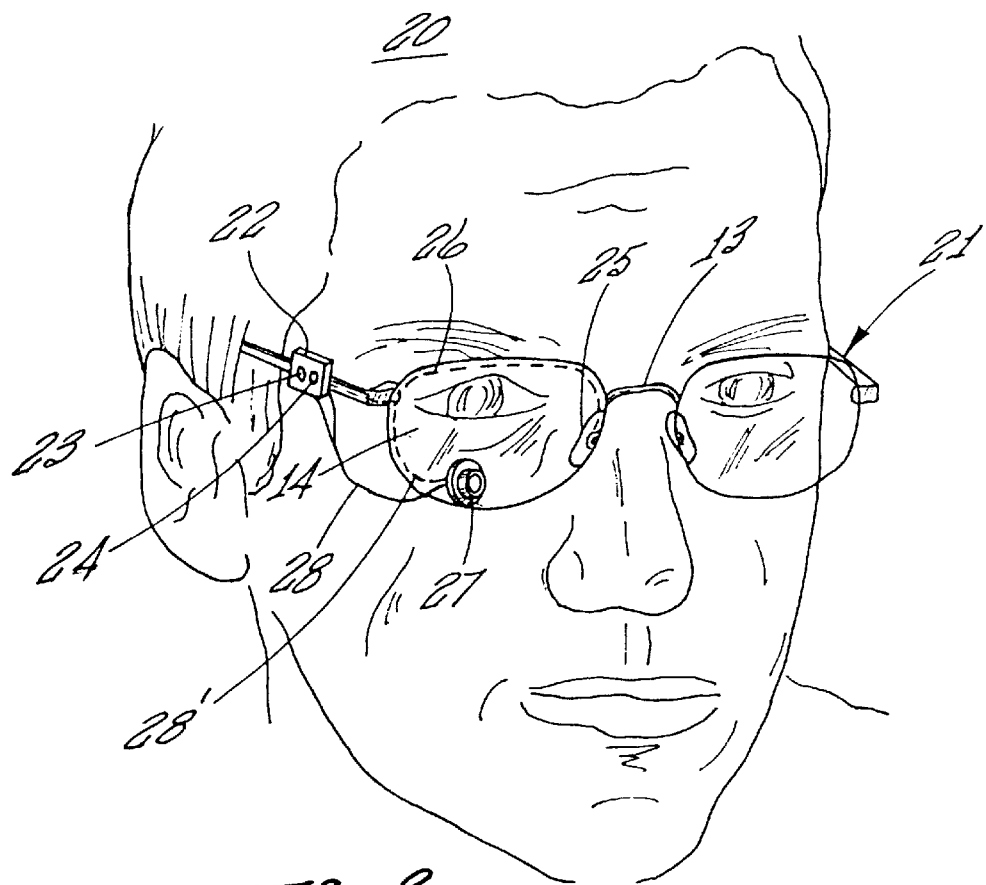
FIG. 2 is a perspective view showing a person wearing eyewear in accordance with the present invention illustrating, in plan view, the preferred placement of the elements of the heart rate monitor relative on the eyewear.

FIG. 2 shows a person 20 wearing an embodiment of the eyewear 21 in accordance with the present invention in perspective view, the figure further illustrating, in plan view, a preferred placement of the elements of the heart rate monitor on the eyewear. The embodiment of the eyewear indicated at numeral 21 comprises prior art eyewear 10 supporting a microprocessor and power supply 22, and having an on/off switch 23 and an optional programming and function switch(s) 24. A heart rate sensor 25 is attached to the bridge portion 13 of the prior art eyewear 10 and makes intimate contact with the bridge of the person's nose. As an important feature of the present invention, the heart rate sensor 25 is either near or overlies, inter alia, the facial and angular arteries, the dorsal nasal artery and the frontal vein. The blood pressure in the facial, angular and dorsal nasal arteries varies with the beating of the heart. The heart rate sensor 25 includes any device which is sensitive to a change in pressure or electrical potential and produces an electrical signal responsive to changes therein. A particularly preferred heart rate sensor is a pressure sensitive resistor such as the 77 mmHg (1.5 psi) to 7800 mmHg (150 psi) variable resistor available from Interlink Electronics Co. as Catalog No. 400. The sensitivity of the sensor is preferably in the range of 0.1 kg/cm$^2$. Alternatively, an infrared Doppler device may be employed for measuring changes in the blood flow rate. Electrical signals generated from Silver-Silver Chloride electrodes such as manufactured by IN VIVO METRIC Co. as catalogue No. E242 can also be employed as a heart rate sensor in accordance with the present invention.

Figure 5:
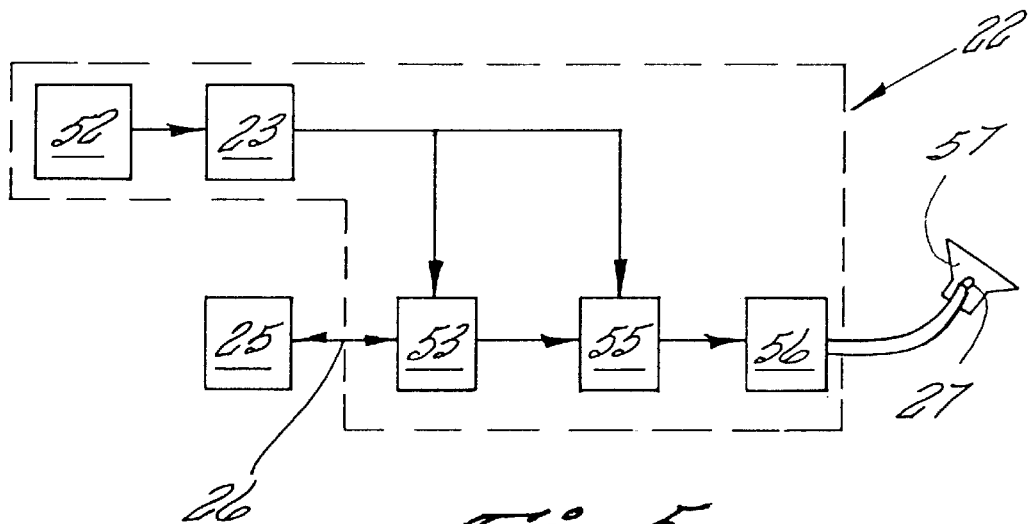
FIG. 5 is a block diagram showing the circuitry of the heart rate monitor in accordance with a preferred embodiment of the present invention.

The heart rate sensor 25 produces an electrical signal which is synchronous with the heartbeat. The electrical signal is conducted to a microprocessor 22 by means of an electrically conductive strip 26 or by transmission means such as by an infrared or magnetic signal transmitter. The electrical signal from the heart rate sensor 25 provides a fluctuating input signal to the microprocessor comprising a sequence of pulses. The microprocessor counts the cyclic variations (ie: pulses) in the input signal over a period of time, most preferably about 10–30 seconds. The microprocessor converts the timed interval count to pulses per minute and presents the resulting count to a digital display driver where it is sampled and stored until the next count resets the digital display driver and the numerical display appearing thereon. The digital display driver output signal is applied to a digital display device such as a liquid crystal display or a LED display. The digital display may be located anywhere on the prior art eyewear 10 but is most preferably located adjacent to, or integral with, the microprocessor 22. The functionally cooperative relationship between the aforesaid elements of the heart rate monitor will be explained below when FIG. 5 is discussed.

The digital display device provides a digital display of the heart rate, which is refreshed at the end of each counting interval. However, in order for a wearer to be able to view the display, the image of the display must be brought into focus at a comfortable focal distance for the human eye such as 10 or more inches in front of the eye. To accomplish this, the numerical image of the digital display device is conducted to a lens 27 by means of an optical fiber bundle 28. The lens 27 focuses the numerical image to appear to the person 20 to be about 10 inches or more in front of the lens 27 and, preferably, near the edge of the person's field of view.

Figure 3:
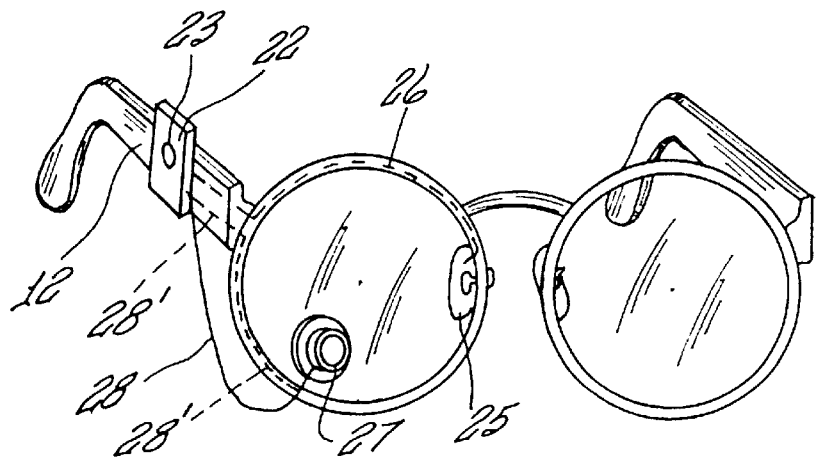
FIG. 3 is a perspective view of eyewear in accordance with the present invention showing a microprocessor, a power supply and a digital display supported by the temple portion of the eyewear, the heart rate sensor supported by the bridge portion of the eyewear, and wherein the image of the digital display is conducted by means of a fiber optic bundle to a display lens preferably attached to the frame or one of the lenses of the eyewear and positioned within the wearer's field of view.

FIG. 3 is a perspective view of eyewear 21 in accordance with the present invention showing a microprocessor, a power supply and a digital display housed within a single package 22 supported by the temple portion 12 of the eyewear 21. In this embodiment, the bridge portion 13 of the eyewear supports the heart rate sensor 25. The numerical image of the digital display is conducted from the package 22 to a display lens attached to one of the lenses 14 of the eyewear by means of a fiber optic bundle 28. Alternatively, the fiber optic bundle 28 can also be integral with, and/or incorporated within, the temple and/or frame of the eyewear as indicated in phantom at 28'. The lens 27 is positioned within the person's field of view in a location, which will not substantially obstruct the field of view. The lens 27 may be attached to the lens 14 by mechanical, or adhesive means or by a suction cup. The lens 27 is adapted to focus the image of the digital display to appear within the comfortable focal plane of the person.

Figure 4:
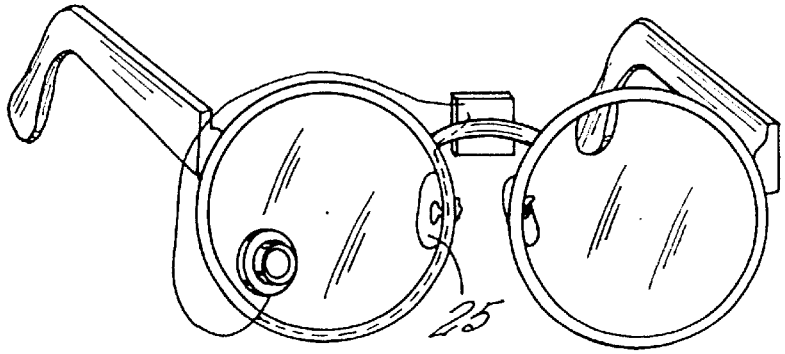
FIG. 4 is a perspective view of a second preferred embodiment of the eyewear in accordance with the present invention wherein the microprocessor, power supply, heart rate sensor and digital display are all supported by the bridge portion of the eyewear.

FIG. 4 is a perspective view of a second preferred embodiment of the eyewear in accordance with the present invention wherein the microprocessor, power supply, heart rate sensor and digital display are all incorporated within or integral with the housing package 22 which is supported by the bridge portion 13 of the eyewear 21. The image of the digital display incorporated within package 22 is conducted to a lens 27 affixed to the lens 14 of the prior art eyewear by means of an image conduit 28 as discussed above.

FIG. 5 is a block diagram showing the circuitry of the heart rate monitor in accordance with a preferred embodiment of the present invention. The circuitry and digital display are preferably housed within a single package 22. A switch 23 supplies power from a power source 52 to a microprocessor 53 and a digital display driver 55.

Figure 6:
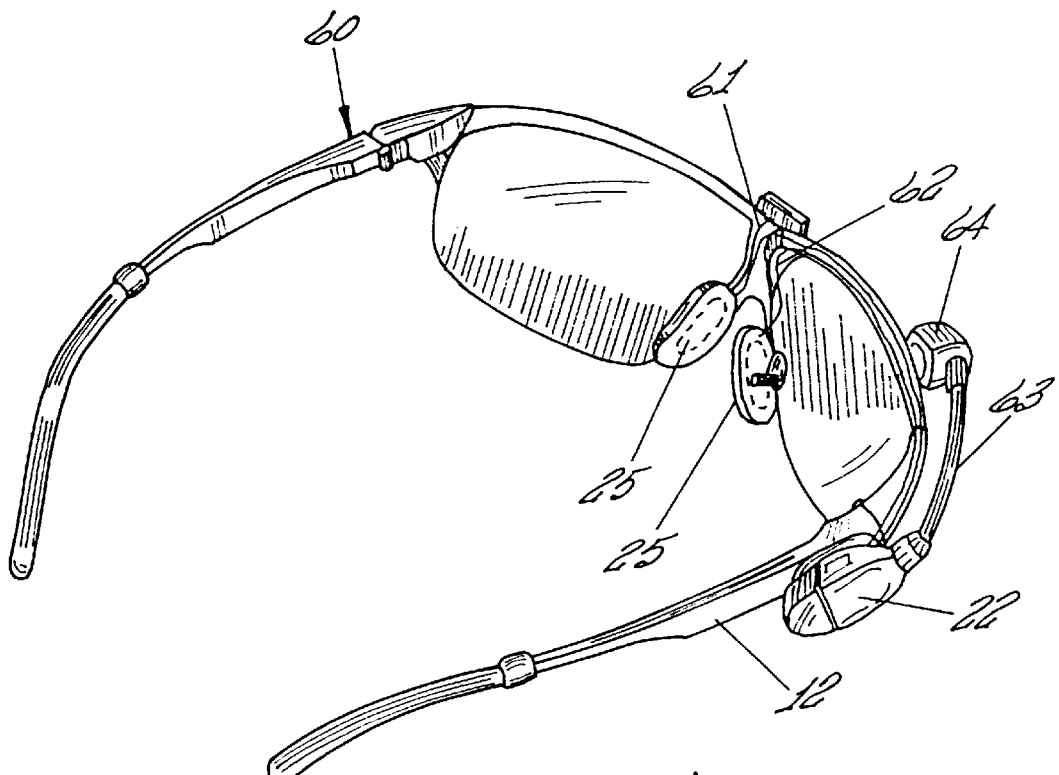
FIG. 6 is a rear perspective view of a particularly preferred embodiment of eyewear in accordance with the present invention showing a housing containing a microprocessor, a power supply and a digital display supported by the temple portion of the eyewear, the heart rate sensor supported by the bridge portion of the eyewear, and wherein the image of the digital display is conducted by means of a fiber optic bundle to a display lens supported by the rigid fiber optic bundle and adjustably positioned within the wearer's field of view.

In a particularly preferred embodiment of the present invention, the heart rate monitor is comprised of a housing containing the signal processing electronics and digital display releasably and reattachably mounted on the temple of eyewear, as discussed above, but the display lens is adjustably mounted on a distal terminus of a rigid fiber optic bundle and disposed forward of the eyewear lens. FIG. 6 is a rear perspective view of eyewear 60 showing a housing 22 containing a microprocessor, a power supply and a digital display, supported by the temple portion 12 of the eyewear 60. The heart rate sensor electrodes 25, one of which is only visible in phantom in FIG. 6, are supported by the bridge portion of the eyewear, with electrode leads 61 and 62 in electrical connection with the microprocessor disposed within the housing 22. The image of the digital display within the housing 22 is conducted by means of a rigid fiber optic bundle 63 to a display lens 64 supported by the rigid fiber optic bundle and adjustably mounted permitting the display lens to be comfortably positioned within the wearer's field of view.

Figure 7:
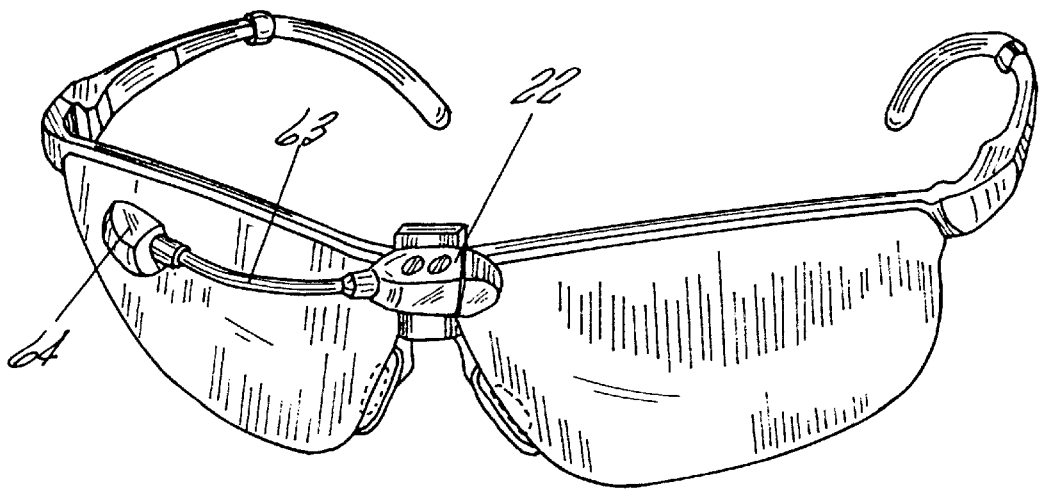
FIG. 7 is a front perspective view of a second preferred embodiment of the eyewear in accordance with the present invention wherein the microprocessor, power supply, heart rate sensor and digital display are contained within a housing supported by the bridge portion of the eyewear, and wherein the image of the digital display is conducted by means of a fiber optic bundle to a display lens disposed on the opposing end thereof and supported by the rigid fiber optic bundle, the display lens being adjustably positioned within the wearer's field of view.

FIG. 7 is a front perspective view of a second preferred embodiment of the eyewear in accordance with the present invention wherein the microprocessor, power supply, heart rate sensor and digital display are contained within a housing, as shown in FIG. 6, but wherein the housing is supported by the bridge portion of the eyewear. As with the embodiment of the heart rate monitor illustrated in FIG. 6, the image of the digital display contained within the housing 22 is conducted to the display lens 64 by means of a rigid fiber optic bundle 63. One end of the fiber optic bundle 63 is supported by the housing 22 and in optical communication with the digital display. The opposing end of the rigid fiber optic bundle supports, and is in optical communication with, the display lens 64. The display lens 64 is adjustably mounted on the fiber optic bundle 63 to permit the display lens to be comfortably positioned within the wearer's field of view.

Figure 8:
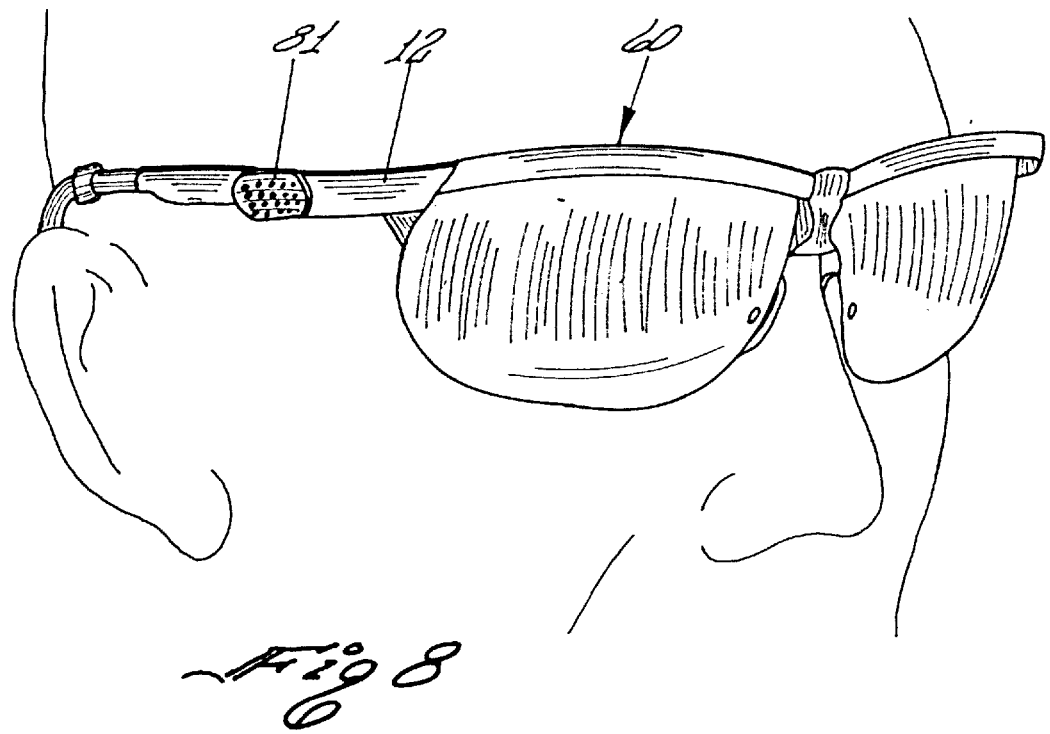
FIG. 8 is a front perspective view showing a person wearing eyewear in accordance with the present invention, illustrating the preferred placement of a releasable and reclosable fastener, such as hook and loop or mushroom-headed fasteners, on the temple of eyewear and adapted to matingly engage a surface of the housing containing the microprocessor, digital display and one end of the fiber optic bundle.

FIG. 8 is a front perspective view showing a person wearing eyewear in accordance with the present invention, illustrating a preferred placement of a releasable and reclosable fastener 81, such as hook and loop, or, most preferably, mushroom-headed fasteners (available from 3M Marine, Part No.: 051135-06539), on the temple 12 of eyewear 60. The exposed surface of the fastener 81 is adapted to matingly engage an engaging surface of a fastener adhered to the housing 22 (FIG. 7). The mating portions of the fastener 81 are affixed to both the temple 12 and the housing by adhesive means.

Figure 9:
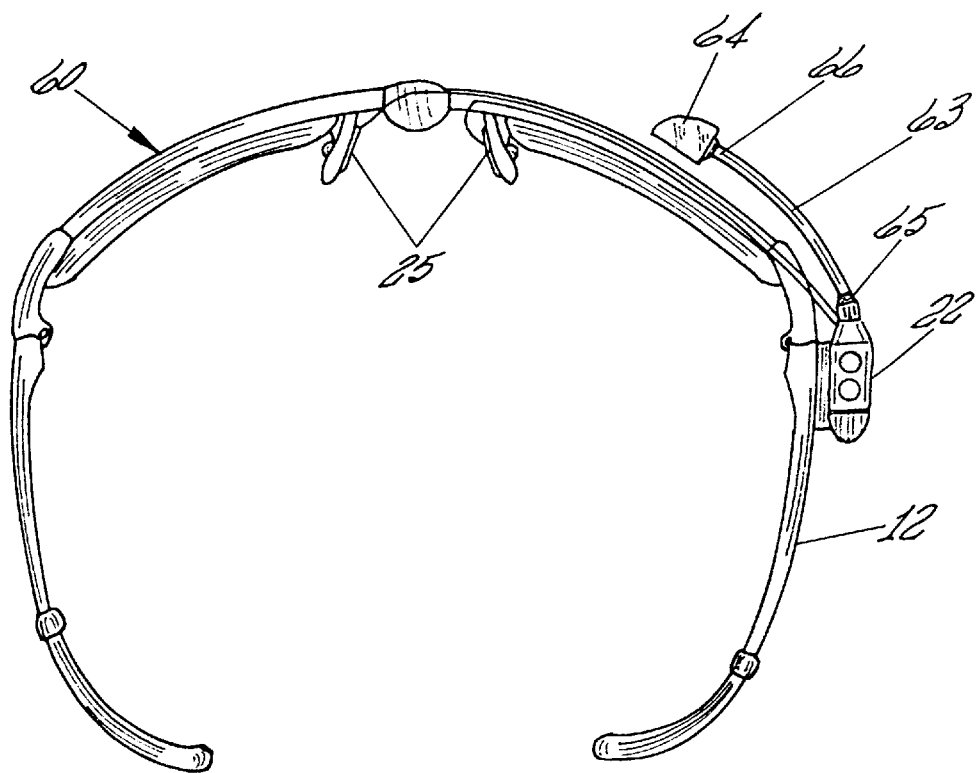
FIG. 9 is a top view of eyewear showing a housing containing a microprocessor, a power supply and a digital display supported by the temple portion of the eyewear, the heart rate sensor supported by the bridge portion of the eyewear, and wherein the image of the digital display within the housing is conducted by means of a fiber optic bundle attached to the housing to a display lens that is adjustably attached to the fiber optic bundle and positioned within the wearer's field of view.

FIG. 9 is a top view of a particularly preferred embodiment of eyewear 60, shown in perspective view in FIG. 6, showing a housing 22, containing a microprocessor, a power supply and a digital display, supported by the temple portion 12 of the eyewear. The heart rate sensors 25 are supported by the bridge portion of the eyewear and may comprise electrically conductive elastomeric pads. The image of the digital display, contained within the housing 22, is conducted, by means of the rigid fiber optic bundle 63 attached to the housing 22 at a proximal end 65 thereof, to a display lens 64 that is adjustably attached to a distal end 66 of the fiber optic bundle. The proximal end 65 of the fiber optic bundle is adjustably attached to the housing 22 to enable the display lens to be positioned within the wearer's field of view in a focal plane corresponding to the wearer's focal length.

Figure 10:
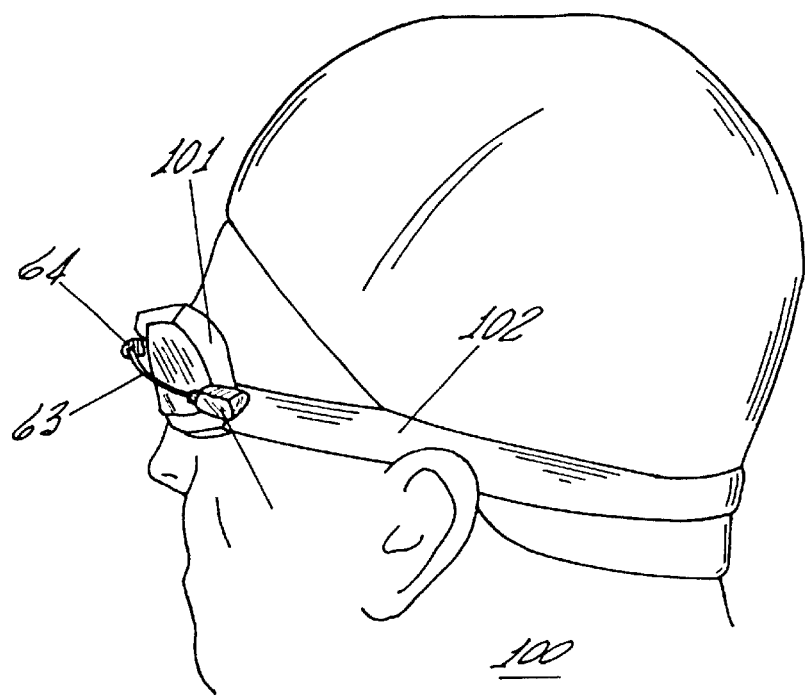
FIG. 10 is a side perspective view of a person wearing swim goggles having a heart rate monitor in accordance with an underwater embodiment of the present invention mounted thereon, wherein the housing containing the microprocessor, power supply and digital display is hermetically sealed and attached to and supported by the strap of the goggles and wherein the image of the digital display within the housing is conducted by means of a rigid fiber optic bundle attached to the housing to a display lens that is adjustably attached to the fiber optic bundle to be in focus when the swimmer and heart rate monitor are submerged.

The heart rate monitor of the present invention may also be used by swimmers for optimizing their level of exertion during a workout. Since the position of both the display lens and rigid fiber optic bundle are adjustable, the focal plane of the display lens, and the image thereon, can be adjusted when water is interposed between the display lens and the lens of the swim goggles, to enable comfortable viewing. In addition, a lap counter can also be included in the digital display. FIG. 10 is a side perspective view of a person 100 wearing swim goggles having a heart rate monitor affixed thereto in accordance with a hermetically sealed embodiment of the present invention. The housing 22, which contains the microprocessor, power supply and digital display, as described above, is attached to and supported by the strap 102 of the goggles by releasable and reclosable fastenting means as discussed above. The image of the digital display within the housing 22 is conducted by means of the rigid fiber optic bundle 63, which is attached to the housing at a proximal end thereof, to a display lens that is adjustably attached to the distal end of the rigid fiber optic bundle. The position of the fiber optic bundle 63 is adjustable, enabling the image of the digital display to be brought into focus when the swimmer and heart rate monitor are submerged.

Figure 11:
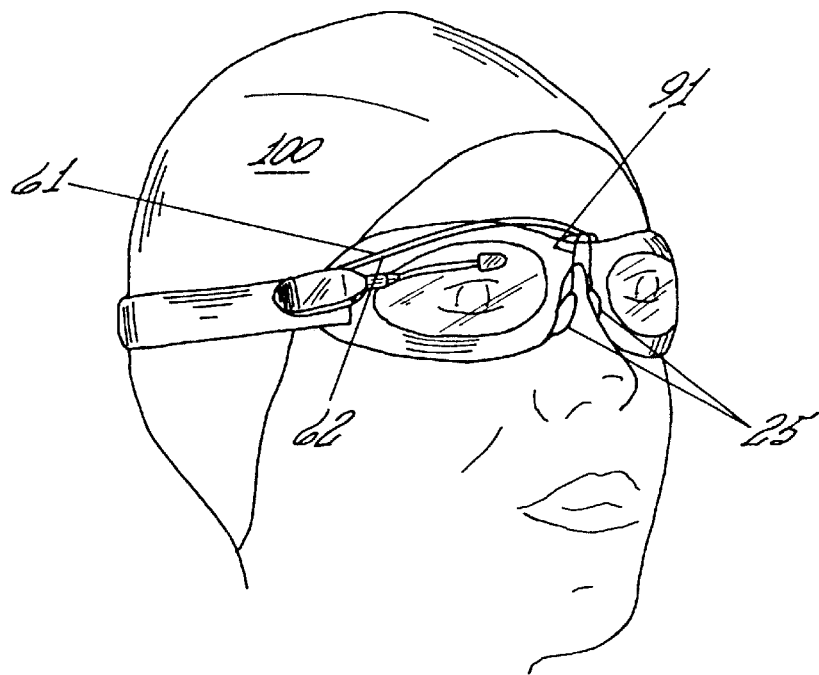
FIG. 11 is a front view of the swimmer illustrated in FIG. 10, showing the pulse rate sensor electrodes disposed on a spring clip attached to the swimmer's nose, the electrode leads being in electrical communication with the microprocessor contained within the hermetically sealed housing.

The versatility of the heart rate monitor can be enhanced by placing the heart rate sensor electrodes on a clip that is attachable to the nose as shown in FIG. 11, enabling its use with a variety of eyewear, including swim goggles. FIG. 11 is a front view of the swimmer 100, illustrated in FIG. 10, showing the pulse rate sensor electrodes 25 disposed on a spring clip 91 attached to the swimmer's nose. The dual electrode leads 61 and 62 are in electrical communication with the heart rate sensor electrodes and provide the electrical input signal corresponding to the pulse rate to the signal processor portion of the microprocessor within the hermetically sealed housing 22. The microprocessor 53, when energized, supplies power to the heart rate sensor 25 and receives, through a input port, a train of pulses therefrom which is synchronous with, and has the same frequency as, the heart beat rate. The microprocessor samples and counts the pulses comprising the pulse train for a preset time interval and computes the counts per minute. The microprocessor provides an output signal at a signal output port which is proportional to the heart beat rate and which constitutes an input signal for the digital display driver 55. The output signal from the digital display driver provides an input signal to the digital display device 56, which provides an optical display of the heart rate in numerical form (the numerical image). The numerical image is conducted to a lens 27 via a fiber optic bundle 28 and focused in a focal plane within the person's range of focus.

In a particularly preferred embodiment of the present invention, the heart rate monitor is comprised of a housing containing the signal processing electronics and digital display releasably and reattachably mounted on the temple of eyewear, as discussed above, but the display lens is adjustably mounted on a distal terminus of a rigid fiber optic bundle and disposed forward of the eyewear lens. FIG. 6 is a rear perspective view of eyewear 60 showing a housing 22 containing a microprocessor, a power supply and a digital display, supported by the temple portion 12 of the eyewear 60. The heart rate sensor electrodes 25, one of which is only visible in phantom in FIG. 6, are supported by the bridge portion of the eyewear, with electrode leads 61 and 62 in electrical connection with the microprocessor disposed within the housing 22. The image of the digital display within the housing 22 is conducted by means of a rigid fiber optic bundle 63 to a display lens 64 supported by the rigid fiber optic bundle and adjustably mounted permitting the display lens to be comfortably positioned within the wearer's field of view.

FIG. 7 is a front perspective view of a second preferred embodiment of the eyewear in accordance with the present invention wherein the microprocessor, power supply, heart rate sensor and digital display are contained within a housing, as shown in FIG. 6, but wherein the housing is supported by the bridge portion of the eyewear. As with the embodiment of the heart rate monitor illustrated in FIG. 6, the image of the digital display contained within the housing 22 is conducted to the display lens 64 by means of a rigid fiber optic bundle 63. One end of the fiber optic bundle 63 is supported by the housing 22 and in optical communication with the digital display. The opposing end of the rigid fiber optic bundle supports, and is in optical communication with, the display lens 64. The display lens 64 is adjustably mounted on the fiber optic bundle 63 to permit the display lens to be comfortably positioned within the wearer's field of view.

FIG. 8 is a front perspective view showing a person wearing eyewear in accordance with the present invention, illustrating a preferred placement of a releasable and reclosable fastener 81, such as hook and loop, or, most preferably, mushroom-headed fasteners (available from 3M Marine, Part No.: 051135-06539), on the temple 12 of eyewear 60. The exposed surface of the fastener 81 is adapted to matingly engage an engaging surface of a fastener adhered to the housing 22 (FIG. 7). The mating portions of the fastener 81 are affixed to both the temple 12 and the housing by adhesive means.

FIG. 9 is a top view of a particularly preferred embodiment of eyewear 60, shown in perspective view in FIG. 6, showing a housing 22, containing a microprocessor, a power supply and a digital display, supported by the temple portion 12 of the eyewear. The heart rate sensors 25 are supported by the bridge portion of the eyewear and may comprise electrically conductive elastomeric pads. The image of the digital display, contained within the housing 22, is conducted, by means of the rigid fiber optic bundle 63 attached to the housing 22 at a proximal end 65 thereof, to a display lens 64 that is adjustably attached to a distal end 66 of the fiber optic bundle. The proximal end 65 of the fiber optic bundle is adjustably attached to the housing 22 to enable the display lens to be positioned within the wearer's field of view in a focal plane corresponding to the wearer's focal length.

The heart rate monitor of the present invention may also be used by swimmers for optimizing their level of exertion during a workout. Since the position of both the display lens and rigid fiber optic bundle are adjustable, the focal plane of the display lens, and the image thereon, can be adjusted when water is interposed between the display lens and the lens of the swim goggles, to enable comfortable viewing. In addition, a lap counter can also be included in the digital display. FIG. 10 is a side perspective view of a person 100 wearing swim goggles having a heart rate monitor affixed thereto in accordance with a hermetically sealed embodiment of the present invention. The housing 22, which contains the microprocessor, power supply and digital display, as described above, is attached to and supported by the strap 102 of the goggles by releasable and reclosable fastening means as discussed above. The image of the digital display within the housing 22 is conducted by means of the rigid fiber optic bundle 63, which is attached to the housing at a proximal end thereof, to a display lens that is adjustably attached to the distal end of the rigid fiber optic bundle. The position of the fiber optic bundle 63 is adjustable, enabling the image of the digital display to be brought into focus when the swimmer and heart rate monitor are submerged.

The versatility of the heart rate monitor can be enhanced by placing the heart rate sensor electrodes on a clip that is attachable to the nose as shown in FIG. 11, enabling its use with a variety of eyewear, including swim goggles. FIG. 11 is a front view of the swimmer 100, illustrated in FIG. 10, showing the pulse rate sensor electrodes 25 disposed on a spring clip 91 attached to the swimmer's nose. The dual electrode leads 61 and 62 are in electrical communication with the heart rate sensor electrodes and provide the electrical input signal corresponding to the pulse rate to the signal processor portion of the microprocessor within the hermetically sealed housing 22.

In summary, the present invention discloses a heart rate monitor adapted to be worn on the head of a person. The heart rate monitor includes a support frame having a bridge portion and attachment means thereon operable for releasably attaching the support frame to the head of the person. The heart rate monitor further includes a power supply which provides power to a microprocessor having a signal input port and a signal output port. The microprocessor is adapted to receive a varying electrical signal and compute the frequency of the signal in beats per minute. In addition, the microprocessor preferably includes a digital display driver and user programming means to indicate preferred goals. The monitor further includes a switch operable for establishing and maintaining electrical communication between the power supply and the microprocessor.

A heart rate sensor adapted to produce an electrical output signal in response to, and synchronous with, the variations in arterial pressure which result during a heart beat cycle is positioned on the support frame to make mechanical contact with the skin of the person, most preferably with the skin on the bridge of the person's nose, when the support frame is attached to the person's head. A digital display in electrical communication with the signal output port of the microprocessor provides a numerical image of the heart beat rate. The numerical image is conducted to an image focusing lens positioned within the person's field of view and, preferably, is attached to the support frame by means of an image conduit such as a fiber optic bundle. The numerical image focusing lens focuses the numerical image in a plane about 10 inches or more in front of the person's eye for comfortable viewing. In addition to the foregoing applications, supplemental performance information comprising a preprogrammed event such as, for example, attaining a target heart rate, may be signaled to the user. Such a supplemental signal may be a audible signal or, more preferably, a visible change in the light or image transmitted through the imagining conduit and presented to the person's eye informing that the programmed event has been reached.

While particular embodiments of the present invention have been illustrated and described, it would be obvious to those skilled in the art that various other changes and modifications can be made without departing from the spirit and scope of the invention. For example, a light conduit other than a fiber optic bundle such as a clear silicone optical waveguide can be used to conduct the numerical image output of the digital display to a viewing lens. In addition, the digital display of the heart beat rate may be accompanied by an auxiliary signal(s) which displays supplemental information such as when a desired heart rate is achieved. Similarly, other digital display devices such as an LED array may be employed.

The heart rate monitor of the present invention may be difficult to read under conditions of diminished light, particularly when a liquid crystal display is used. It may be desirable to include back lighting for the liquid crystal display with a source of light such as, for example, a LED within the housing package 22. Similarly, when the user is engaged in a vigorous activity such as running, a filter may be necessary to distinguish pulses from the heart rate sensor which correlate with the heart beat and extraneous pulses due to vibrational "noise" resulting from the kinetic activity required by the nature of the performance. It is therefore intended to cover in the appended claims all such changes and modifications that are within the scope of this invention.

What I claim is:

1. A heart rate monitor adapted to be attached to an accessory worn on the head of a person comprising:

(a) a housing having attachment means thereon, operable for releasably attaching said housing to the accessory;

(b) a power supply contained within said housing;

(c) a microprocessor contained within said housing, said microprocessor receiving power from said power supply and being operable for receiving an electrical input signal comprising a sequence of electrical pulses which are substantially synchronous with the persons heart beat at a signal input port, computing an electrical output signal proportional to the number of pulses per minute and presenting the output signal at a signal output port;

(d) a heart rate sensor comprising a pair of electrodes mounted on a nose clip whereon when said nose clip is attached to the person's nose, the electrodes make physical contact with the skin of the person's nose, said heart rate sensor electrodes being separate from said housing and being in electrical communication with said signal input port of said microprocessor;

(e) a digital display in electrical communication with said signal output port of said microprocessor, said digital display being operable for providing a numerical image corresponding to said output signal;

(f) an image focusing lens positioned within the person's field of view;

(g) a rigid fiber optic bundle having a proximal end attached to said housing and in optical communication with said digital display, and a distal end affixed to said image focusing lens, said rigid fiber optic bundle being operable for conducting said numerical image from said digital display to said image focusing lens.

* * * * *